US012621335B2

(12) United States Patent
Khaleel et al.

(10) Patent No.: US 12,621,335 B2
(45) Date of Patent: May 5, 2026

(54) SYSTEMS AND METHODS FOR TESTING DISTRIBUTED SYSTEMS USING INJECTED NETWORK PARTITIONS

(71) Applicant: Acronis International GmbH, Schaffhausen (CH)

(72) Inventors: Seba Tayser Khaleel, Waterloo (CA); Sreeharsha Udayashankar, Waterloo (CA); Samer Al-Kiswany, Waterloo (CA); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 220 days.

(21) Appl. No.: 18/399,839

(22) Filed: Dec. 29, 2023

(65) Prior Publication Data

US 2025/0220036 A1 Jul. 3, 2025

(51) Int. Cl.
*H04L 9/40* (2022.01)
*H04L 43/065* (2022.01)
*H04L 43/50* (2022.01)

(52) U.S. Cl.
CPC ........ *H04L 63/1433* (2013.01); *H04L 43/065* (2013.01); *H04L 43/50* (2013.01)

(58) Field of Classification Search
CPC .... H04L 63/1433; H04L 43/065; H04L 43/50
See application file for complete search history.

(56) References Cited

U.S. PATENT DOCUMENTS 6,108,309 A * 8/2000 Cohoe ................... H04L 41/145
370/241
6,243,832 B1 * 6/2001 Eckes ...................... H04L 43/50
714/E11.193
7,383,579 B1 * 6/2008 Catanzano .............. G06F 21/51
726/13

(Continued)

FOREIGN PATENT DOCUMENTS

CN 106973398 B * 2/2020 ............. H04L 43/50
JP 2010226401 A * 10/2010
JP 5069139 B2 * 11/2012

*Primary Examiner* — Richard G Keehn
(74) *Attorney, Agent, or Firm* — ArentFox Schiff LLP; Michael Fainberg

(57) ABSTRACT

Disclosed herein are systems and method for testing distributed systems using injected network partitions. A method may include monitoring communication between a plurality of computing devices in a distributed system to identify each communication link that exists between two respective computing devices in the distributed system. The method may include generating a communications list comprising a plurality of computing device pairs and injecting a network partition in at least one pair of the plurality of computing device pairs. The method may include detecting whether a performance degradation greater than a threshold performance occurs in response to the network partition. In response to detecting the performance degradation greater than the threshold performance, the method may include generating and transmitting a security report indicative of the performance degradation and the at least one pair of the plurality of computing device pairs causing the performance degradation.

17 Claims, 4 Drawing Sheets

(56)     References Cited

U.S. PATENT DOCUMENTS

| | | | |
|---|---|---|---|
| 8,769,115 B2 * | 7/2014 | Hopkins | H04L 43/50 |
| | | | 709/227 |
| 9,450,854 B2 * | 9/2016 | Nadeau | H04L 43/50 |
| 11,456,076 B2 * | 9/2022 | Holmquist | H04L 43/50 |
| 2007/0147590 A1 * | 6/2007 | Liang | H04M 3/304 |
| | | | 379/1.02 |
| 2012/0197582 A1 * | 8/2012 | Richardson | G06F 11/2733 |
| | | | 702/122 |
| 2015/0007220 A1 * | 1/2015 | Nakano | H04N 21/6332 |
| | | | 725/110 |
| 2020/0092192 A1 * | 3/2020 | Ekambaram | H04L 43/50 |
| 2020/0162951 A1 * | 5/2020 | Ketonen | H04L 43/50 |
| 2020/0245168 A1 * | 7/2020 | Ketonen | H04L 43/50 |
| 2020/0322826 A1 * | 10/2020 | Wangler | H04L 43/50 |
| 2022/0060498 A1 * | 2/2022 | Head, Jr. | H04L 63/1433 |
| 2023/0093883 A1 * | 3/2023 | Robertson | H04L 43/50 |
| | | | 370/229 |
| 2023/0269789 A1 * | 8/2023 | Azam | H04W 48/18 |
| | | | 370/329 |
| 2024/0121198 A1 * | 4/2024 | Strein | H04L 43/50 |

* cited by examiner

100

200

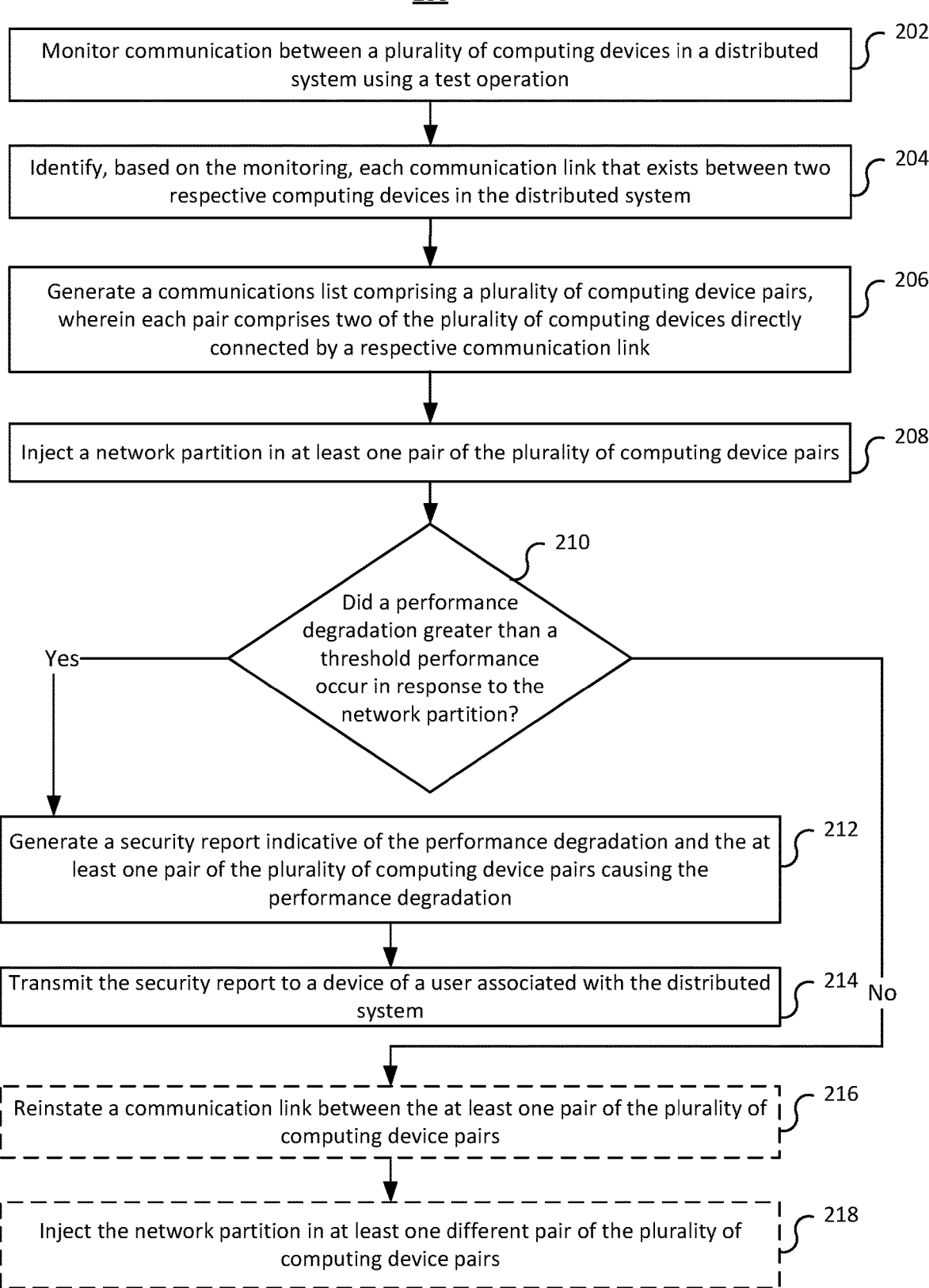

202 — Monitor communication between a plurality of computing devices in a distributed system using a test operation 204 — Identify, based on the monitoring, each communication link that exists between two respective computing devices in the distributed system 206 — Generate a communications list comprising a plurality of computing device pairs, wherein each pair comprises two of the plurality of computing devices directly connected by a respective communication link 208 — Inject a network partition in at least one pair of the plurality of computing device pairs 210 — Did a performance degradation greater than a threshold performance occur in response to the network partition?

Yes

212 — Generate a security report indicative of the performance degradation and the at least one pair of the plurality of computing device pairs causing the performance degradation 214 — Transmit the security report to a device of a user associated with the distributed system    No 216 — Reinstate a communication link between the at least one pair of the plurality of computing device pairs 218 — Inject the network partition in at least one different pair of the plurality of computing device pairs

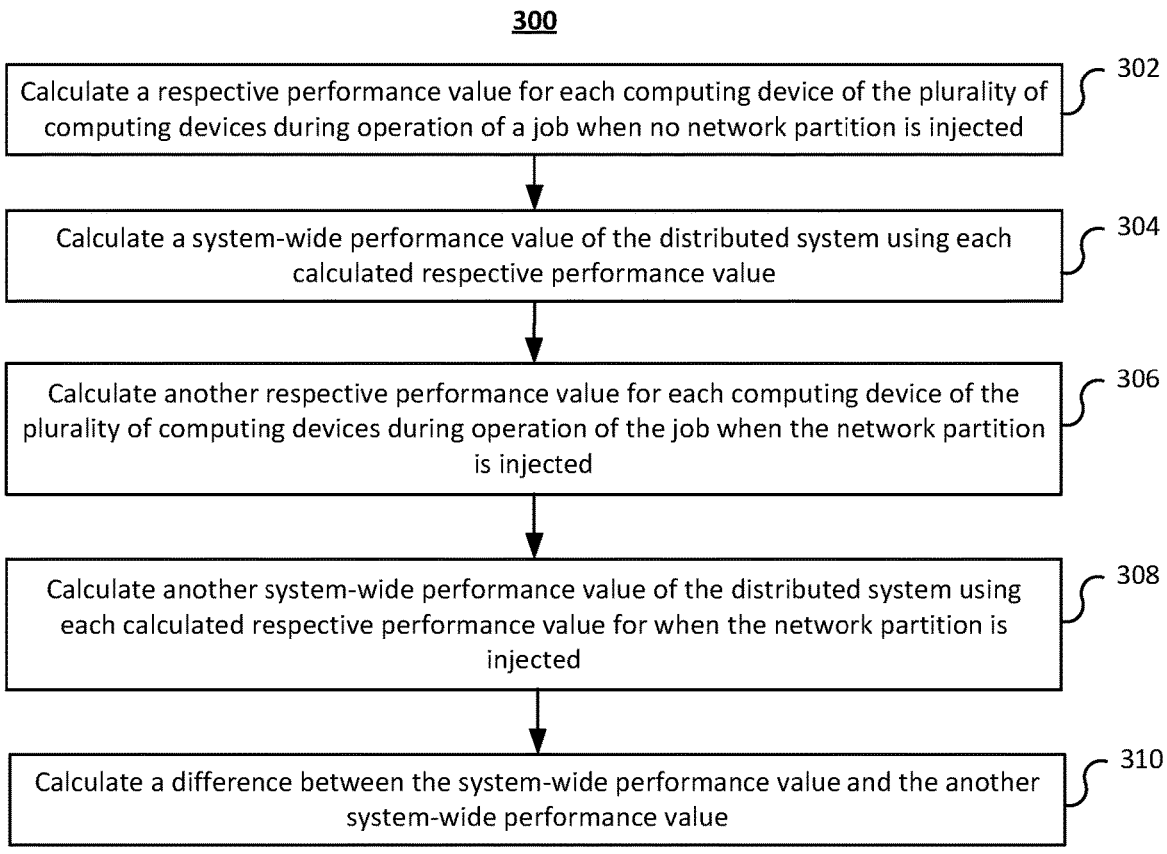

302 Calculate a respective performance value for each computing device of the plurality of computing devices during operation of a job when no network partition is injected 304 Calculate a system-wide performance value of the distributed system using each calculated respective performance value 306 Calculate another respective performance value for each computing device of the plurality of computing devices during operation of the job when the network partition is injected 308 Calculate another system-wide performance value of the distributed system using each calculated respective performance value for when the network partition is injected 310 Calculate a difference between the system-wide performance value and the another system-wide performance value

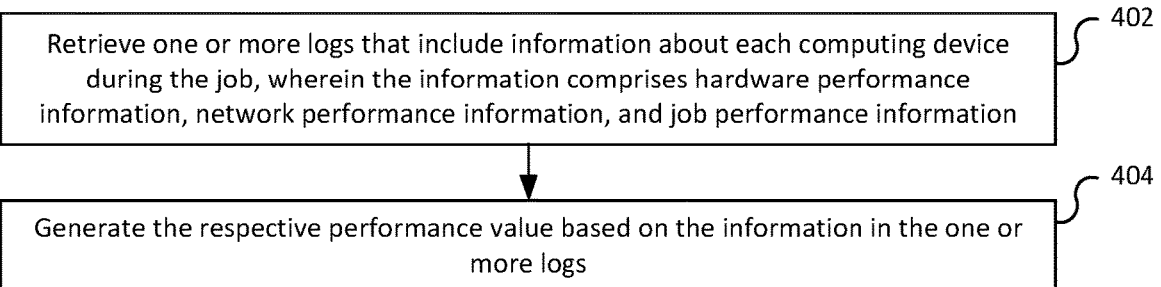

402 Retrieve one or more logs that include information about each computing device during the job, wherein the information comprises hardware performance information, network performance information, and job performance information 404 Generate the respective performance value based on the information in the one or more logs

FIG. 4

SYSTEMS AND METHODS FOR TESTING DISTRIBUTED SYSTEMS USING INJECTED NETWORK PARTITIONS

FIELD OF TECHNOLOGY

The present disclosure relates to the field of data security, and, more specifically, to systems and methods for testing distributed systems using injected network partitions.

BACKGROUND

Modern networks are complex and can break. One complex network failure is a network partition, which severs communication between a subset of nodes. Failure reports indicate that this network fault can lead to catastrophic network failures. Even a partial network partition may be deadly. A partial network partition is when some network nodes or devices lose connectivity with certain parts of the network while still being able to communicate with other nodes within the isolated portion. This can result in an asymmetrical network where some nodes are reachable, while others are not, leading to potential issues in data consistency and communication between different parts of the network.

SUMMARY

In one exemplary aspect, the techniques described herein relate to a method for testing a distributed system, the method including: monitoring communication between a plurality of computing devices in a distributed system using a test operation; identifying, based on the monitoring, each communication link that exists between two respective computing devices in the distributed system; generating a communications list including a plurality of computing device pairs, wherein each pair includes two of the plurality of computing devices directly connected by a respective communication link; injecting a network partition in at least one pair of the plurality of computing device pairs; detecting whether a performance degradation greater than a threshold performance occurs in response to the network partition; in response to detecting the performance degradation greater than the threshold performance, generating a security report indicative of the performance degradation and the at least one pair of the plurality of computing device pairs causing the performance degradation; and transmitting the security report to a device of a user associated with the distributed system.

In some aspects, the techniques described herein relate to a method, further including: in response to not detecting the performance degradation greater than the threshold performance, reinstating a communication link between the at least one pair of the plurality of computing device pairs; and injecting the network partition in at least one different pair of the plurality of computing device pairs.

In some aspects, the techniques described herein relate to a method, further including iterating through all pairs in the communications list by injecting the network partition in each pair and combination of pairs while assessing for performance degradation after each injection.

In some aspects, the techniques described herein relate to a method, wherein the test operation includes one or more of: reading or writing data from a storage device of the distributed system, producing and processing messages in a message queuing system of the distributed system, and reading or writing to a map in a distributed data structure of the distributed system.

In some aspects, the techniques described herein relate to a method, wherein detecting whether the performance degradation greater than the threshold performance occurs includes: calculating a respective performance value for each computing device of the plurality of computing devices during operation of a job when no network partition is injected; calculating a system-wide performance value of the distributed system using each calculated respective performance value; calculating another respective performance value for each computing device of the plurality of computing devices during operation of the job when the network partition is injected; calculating another system-wide performance value of the distributed system using each calculated respective performance value for when the network partition is injected; and calculating a difference between the system-wide performance value and the another system-wide performance value.

In some aspects, the techniques described herein relate to a method, wherein calculating the respective performance value for each computing device includes: retrieving one or more logs that include information about each computing device during the job, wherein the information includes hardware performance information, network performance information, and job performance information; and generating the respective performance value based on the information in the one or more logs.

In some aspects, the techniques described herein relate to a method, wherein injecting the network partition includes changing iptables configuration of the at least one pair to cut communication between computing devices of the at least one pair.

In some aspects, the techniques described herein relate to a method, wherein injecting the network partition includes utilizing software-defined networking (SDN) rules to cut communication between computing devices of the at least one pair.

In some aspects, the techniques described herein relate to a method, further including monitoring, subsequent to injecting the network partition, for attributes indicative of critical issues, wherein the attributes includes one or more of: a job failure, a device failure, data loss, dropped packets, freezes.

It should be noted that the methods described above may be implemented in a system comprising a hardware processor. Alternatively, the methods may be implemented using computer executable instructions of a non-transitory computer readable medium.

In some aspects, the techniques described herein relate to a system for testing a distributed system, including: at least one memory; and at least one hardware processor coupled with the at least one memory and configured, individually or in combination, to: monitor communication between a plurality of computing devices in a distributed system using a test operation; identify, based on the monitoring, each communication link that exists between two respective computing devices in the distributed system; generate a communications list including a plurality of computing device pairs, wherein each pair includes two of the plurality of computing devices directly connected by a respective communication link; inject a network partition in at least one pair of the plurality of computing device pairs; detect whether a performance degradation greater than a threshold performance occurs in response to the network partition; in response to detecting the performance degradation greater than the threshold performance, generate a security report indicative of the performance degradation and the at least one pair of the plurality of computing device pairs causing the performance degradation; and transmit the security report to a device of a user associated with the distributed system.

In some aspects, the techniques described herein relate to a non-transitory computer readable medium storing thereon computer executable instructions for testing a distributed system, including instructions for: monitoring communication between a plurality of computing devices in a distributed system using a test operation; identifying, based on the monitoring, each communication link that exists between two respective computing devices in the distributed system; generating a communications list including a plurality of computing device pairs, wherein each pair includes two of the plurality of computing devices directly connected by a respective communication link; injecting a network partition in at least one pair of the plurality of computing device pairs; detecting whether a performance degradation greater than a threshold performance occurs in response to the network partition; in response to detecting the performance degradation greater than the threshold performance, generating a security report indicative of the performance degradation and the at least one pair of the plurality of computing device pairs causing the performance degradation; and transmitting the security report to a device of a user associated with the distributed system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 illustrates a flow diagram of a method for testing distributed systems using injected network partitions.

FIG. 3 illustrates a flow diagram of a method for calculating a difference in distributed system performance before and after insertion of a network partition.

FIG. 4 illustrates a flow diagram of a method for calculating a performance value based on one or more logs.

DETAILED DESCRIPTION

Exemplary aspects are described herein in the context of a system, method, and computer program product for testing distributed systems using injected network partitions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure provides systems and methods to test software systems to see if they can operate properly when a network partition happens. The described approach can detect software bugs that happen due to network partitions in distributed systems and causes the execution of the application to either pause or terminate. This will help developers remedy these bugs early in the development processes and avoid production failures. In general, the systems and methods capture the connections established when a distributed system is running and insert network partitions between the end points of the connections in order to test if the injected partitions will pause or kill the execution of the application and report failures.

Figure 1:
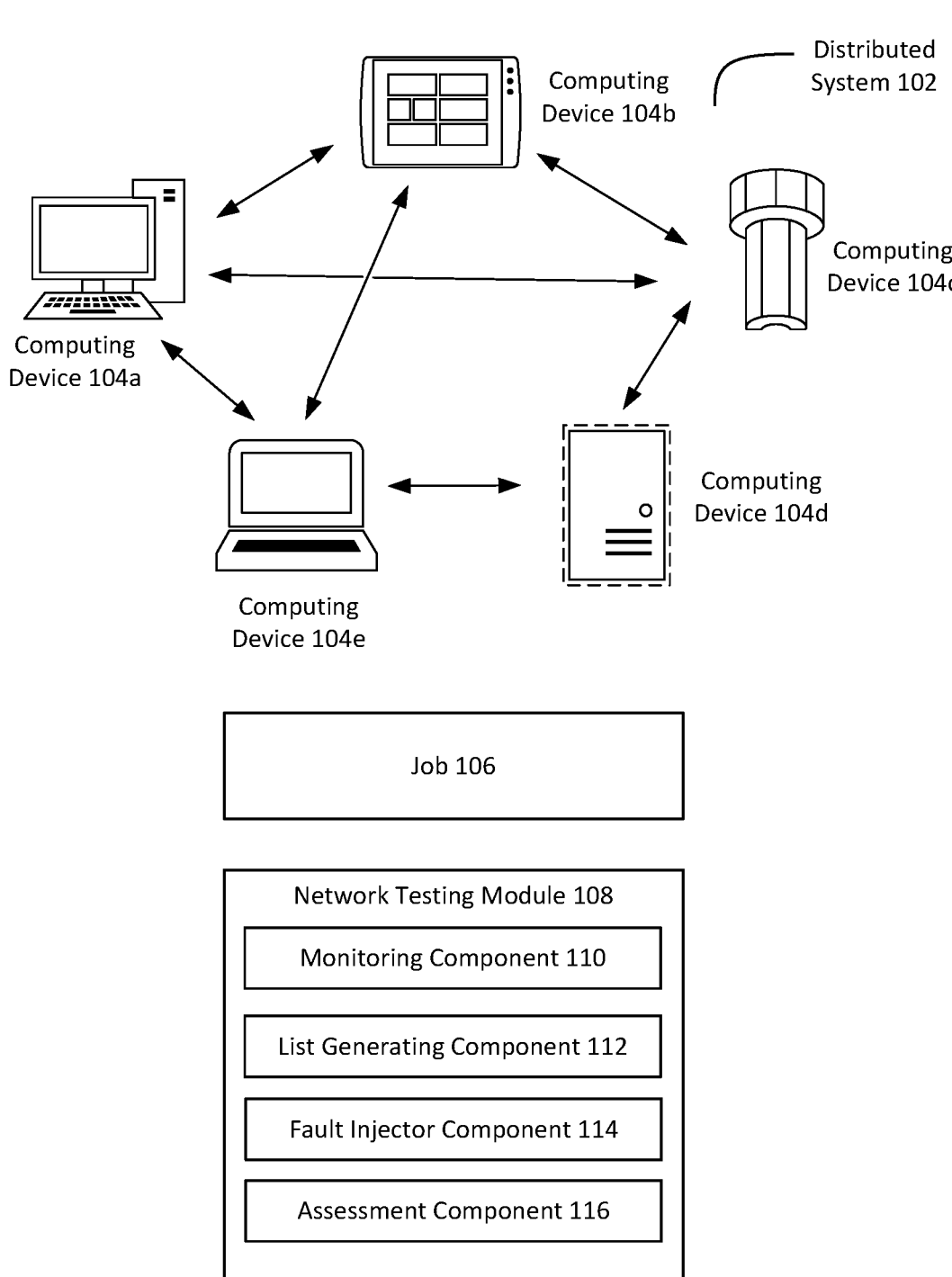
FIG. 1 is a block diagram illustrating a system for testing distributed networks using injected network partitions.

FIG. 1 is a block diagram illustrating system 100 for testing distributed networks using injected network partitions. System 100 includes network testing module 108, which assesses the resiliency of distributed system 102. In an exemplary aspect, distributed system 102 is made up of multiple computing devices, which collectively execute job 106. For example, job 106 may involve running one or more applications. In some aspects, distributed system 102 includes different types of computing devices. For example, computing device 104a is a computer, computing device 106b is a tablet, computing device 104c is a quantum computer, computing device 104d is a server, and computing device 104e is a laptop. Examples of other computing devices include smart speakers, augmented/virtual/mixed reality devices, biomedical devices, etc. In some aspects, distributed system 102 includes the same type of computing device. For example, all of the devices may be servers.

In some aspects, the devices in distributed system 102 communicate with one another over a local access network (LAN). In other aspects, the devices in distributed system 102 communicate with one another over a wide access network (LAN) such as the Internet.

Network testing module 108 is configured to utilize monitoring component 110, list generating component 112, fault injector component 114, and assessment component 116 over two phases: a monitoring phase and a testing phase.

During the monitoring phase, for a given distributed system 102, monitoring component 110 captures which nodes (e.g., computing devices) communicate with each other. To do this, monitoring component 110 performs a test on each node that runs simple operations. Such operations may involve reading or writing data from a storage system, producing and processing messages in a message queuing system, and reading or writing to a map in a distributed data structure. During the test, monitoring component 110 monitors the distributed network (used interchangeably with distributed system) to identify which nodes talk to each other.

In some aspects, monitoring component 110 also generates one or more logs which are indicative of the normal behaviour of distributed system 102. For example, monitoring component 110 may identify the behaviour of distributed system 102 when performing job 106. The log(s) may include information about computer performance (e.g., CPU usage, memory utilization, storage limits, etc.), network performance (e.g., bandwidth, upload rate, download rate, etc.) and job performance (e.g., time to complete each portion of job 106, success/failure state of job 106, etc.).

In some aspects, the system executes a software on each node to capture the communication. For example, one or more components of network testing module 108 (e.g., monitoring component 110) may be agent(s) that are installed on each computing device of distributed system 102. Monitoring component 110 intercepts every packet received and/or transmitted by a particular computing device, and identifies the sender and/or receiver of the packet, respectively.

List generating component 112 parses the captured data into a list of node pairs that communicate with each other during the test. For example, the arrows in FIG. 1 may represent communication links between respective computing devices. For exemplary purposes, suppose that computing devices that are not connected by a single arrow do not communicate with one another directly. Referring to FIG. 1, this implies that computing device 104*b* does not directly communicate with computing device 104*d*, and that computing device 104*e* does not directly communicate with computing device 104*c*. Based on the results of the test performed by monitoring component 110, list generating component 112 may generate the following list of node pairs:

| Computing Device | Computing Device |
|---|---|
| A | B |
| A | C |
| A | E |
| B | C |
| B | E |
| C | D |
| D | E |

A pair such as (A, B) indicates that computing device 104*a* and computing device 104*b* may exchange packets.

In some aspects, monitoring component 110 uses pyshark for capturing connections. Pyshark is a python wrapper for Tshark, which is a packet capture tool that captures packets from different interfaces in real time and analyzes these packets. Monitoring component 110 may then summarize the captured packets and remove duplications; this helps reduce the number of testcases that network testing module 108 needs to test, and eliminates any outdated connections in the system out of the test scenario.

Subsequent to generating the list of node pairs, network testing module 108 initiates the testing phase. Fault injector component 114 then injects a network fault (used interchangeably with injecting a network partition) between two nodes, which causes a break in communication between said nodes. For example, fault injector component 114 may identify the first node pair in the list and inject a network fault. After analyzing the consequences of injecting the network fault, fault injector component 114 may reinstate the communication between the first node pair and move down the list to the next node pair (i.e., iterate through all node pairs). In some aspects, injecting a network fault involves fault injector component 114 changing the iptables configuration on two nodes to cut the communication between said two nodes. In some aspects, injecting a network fault involves fault injector component 114 utilizing software-defined networking (SDN) rules to break communication, an example is Traffic Forwarding Rules, in which SDN controllers allow network administrators to define rules that influence how traffic is routed and processed. By creating specific rules, administrators can drop connections between devices or segments of the network. An SDN rule such as Open flow rules could be used to drop traffic from or for a particular IP address, port, or protocol. Also, rules can be set up to reroute traffic from specific paths or devices.

The break in communication disrupts the typical behaviour of the distributed system 102 and may prevent the execution of job 106. As distributed systems are designed to handle network problems, when the communication is broken, the distributed systems may execute fault tolerance mechanisms that are designed to detect and handle such network failures. However, such mechanisms often do not expect a partial network partition in which a node is reachable from all other nodes in the network except one node and usually do not handle this failure properly. As a result, the mechanism may succeed or fail at resolving the network partition.

During the testing phase, the objective is to assess the resiliency of distributed system 102 and detect potential bugs that may arise due to communication errors. As a result of the network fault injection, databases of distributed system 102 may lose data, message queuing systems of distributed system 102 may duplicate messages, data processing engines of distributed system 102 may stop working. Manifestation of the injection ultimately depends on the upper layer where distributed system 102 runs and how the upper layer reacts to network faults injected in the lower layer.

Assessment component 116 is configured to evaluate the performance of distributed system 102. For example, assessment component 116 may instruct distributed system 102 to perform a job that was performed under normal conditions (i.e., no network faults) and captured in logs by monitoring component 110. Suppose that distributed system 102 executes job 106 while the first node pair is unable to communicate. The tool compares the behaviour of system 102 with network partitions injected with its normal behaviour without any partitions.

If the network performance has not degraded or a bug is not detected, based on the comparison, fault injector component 114 repairs the connection between the two nodes and advances to the next node pair in the list and injects a network fault in the next node pair. Assessment component 116 collects all bug incidents or network performance issues in a report. In particular, the network conditions that led to the bug or performance issue is included in the report. For example, if a network fault between two nodes led to a bug, assessment component 116 includes the identifiers of the nodes in the report. Ultimately this allows a developer to reproduce the bug for patching purposes.

In some aspects, assessment component 116 classifies how critical an error or bug is. For example, an error/bug that leads to failed jobs or severe performance degradation may be classified as a critical issue. An error/bug that causes reasonable performance degradation may be classified as a medium level issue. An error/bug that causes minor performance degradation may be classified as a low level issue.

Consider the following example in which monitoring component 110 logs the normal behaviour of distributed system 102 when it executes job 106. Job 106 may be an application in which computing device 104*a* receives data from computing device 104*b* and computing device 104*e*, performs a function on the data, and transmits the result to computing device 104*c*. Suppose that during normal operation, monitoring component 110 generates a log with the following attributes. It should be noted that for simplicity, only a few data types are shown below. One skilled in the art will appreciate that computer logs may include various other data types and information, and may be organized in any structured manner:

| Timestamp | 01:11:00 | 01:11:05 | 01:11:10 | ... | 01:11:30 |
|---|---|---|---|---|---|
| Computing Device | A | A | A | ... | A |
| CPU Usage | 20% | 15% | 70% | ... | 90% |
| Memory Usage | 55% | 50% | 65% | ... | 55% |
| Download Speed | 15 Mbps | 15 Mbps | 12 Mbps | ... | 13 Mbps |
| Upload Speed | 10 Mbps | 11 Mbps | 9 Mbps | ... | 8 Mbps |
| Sub-Job 1 Status | Start | Complete | | ... | |
| Sub-Job 2 Status | | Start | | ... | Complete |
| Job Status | | | | ... | Success |
| ... | ... | ... | ... | ... | ... |

In the log example provided above, certain hardware performance, network performance, and job performance data points are provided. Although only the information regarding computing device A is shown, it should be understood that the log may include information about all other computing devices as well. Job 106 is split into two sub-jobs that computing device A is responsible for. For example, sub-job 1 may involve collecting data and sub-job 2 may involve processing the data (e.g., applying the function). Under normal conditions, computing device 104*a* may successfully perform its sub-jobs that contribute to job 106.

When assessment component 116 tests the performance of distributed system 102 after the communication between computing device 104*a* and computing device 104*b* is ended, job 106 is run again and monitoring component 110 may generate the following log:

| Timestamp | 02:11:00 | 02:11:05 | 02:11:10 | ... | 02:11:50 |
|---|---|---|---|---|---|
| Computing Device | A | A | A | ... | A |
| CPU Usage | 30% | 35% | 70% | ... | 90% |
| Memory Usage | 55% | 50% | 65% | ... | 55% |
| Download Speed | 15 Mbps | 15 Mbps | 12 Mbps | ... | 13 Mbps |
| Upload Speed | 10 Mbps | 11 Mbps | 9 Mbps | ... | 8 Mbps |
| Sub-Job 1 Status | Start | | Complete | ... | |
| Sub-Job 2 Status | | | Start | ... | Complete |
| Job Status | | | | ... | Success |
| ... | ... | ... | ... | ... | ... |

As previously mentioned, computing device 104*a* may need data from computing device 104*b* to perform a function and complete job 106. However, because the communication between computing device 104*a* and 104*b* does not exist due to the injected network fault, the data cannot be sent directly. In some aspects, this may simply lead to the failure of the job. In this case, assessment component 116 reports the network fault to be a critical issue because the network fault prevents the job from being performed. Other signs of a critical issues may include, but are not limited to computing device 104*a* experiencing data loss, dropped packets, freezes, etc.

However, as seen in the log above, the job still succeeds. This is possible due to the fault tolerance mechanisms that distributed system 102 may be configured with. According to the log, the CPU usage of computing device 104*a* is higher because computing device 104*a* needs to retrieve the missing data (possibly via computing device 104*c*, which is still connected to computing device 104*b*). Sub-job 1 and sub-job 2 take longer to complete. Sub-job 2 is delayed by 5 seconds as well. Other incidents due to the fault tolerance mechanisms may involve duplicative messages, poor message queuing, etc. For example, because computing device

104*a* becomes increasingly reliant on computing device 104*e*, the queues of computing device 104*e* may fill up, causing significant performance issues in both devices. This influences the performance of the distributed system as a whole because it is possible that multiple jobs may be running—causing a snowballing effect.

Assessment component 116 may scan the logs to check for errors or bugs. Assessment component 116 may also execute a function that outputs an amount of performance degradation in the distributed system. For example, a performance value of a device may be characterized by an algorithm that receives data such as each of the hardware, network, and job information of the device. Assessment component 116 may determine performance values for both normal behaviour conditions and network fault conditions for each device in the distributed system. Assessment component 116 may then add the performance values to determine a system-wide performance value. Assessment component 116 may use this same technique for network fault conditions and then calculate a difference between the system-wide performance values for both conditions. Suppose that the performance value of distributed system 102 during the normal conditions is 70 and the performance value of distributed system 102 during a network fault between computing device 104*a* and computing device 104*b* is 50. Based on these values, assessment component 116 may determine that there is a 28.5% dip in performance.

Assessment component 116 may compare this dip against a plurality of performance drop thresholds, where each threshold is associated with a particular class. An example set of thresholds is shown below:

| Class | Degradation |
|---|---|
| Critical Issue | >50% |
| High-level Issue | 26-50% |
| Medium-level Issue | 16-25% |
| Low-level Issue | 5-15% |
| Non-Issue | 0-5% |

Based on these thresholds, assessment component 116 may determine that a network fault created between computing device 104*a* and computing device 104*b* will create a high-level issue.

In some aspects, fault injector component 114 may inject multiple network faults in different combinations of node pairs. This is to provide a detail and inclusive security report that can be used to identify the weaknesses in the network. For example, after testing the system when a network fault is injected in the first node pair in the list (e.g., computing device 104*a* and computing device 104*b*), fault injector component 114 may inject a network fault in the second node pair. After iterating between all single communication pairs, fault injector component 114 may begin injecting network faults in various combinations of pairs (e.g., the first and second pairs in the list, the first and third pairs, and the first, second, and third pairs, etc.).

Network testing module 108 may transmit the security report created by assessment component 116 to a developer of the application associated with the job 106 and/or to an administrator of distributed system 102. This enables the developer and/or administrator to generate a patch that can fix the performance issues and improve the fault tolerance of distributed system 102. In general, after a patch is issued, network testing module 108 may be reused to evaluate the effectiveness of the patch in resolving the issues highlighted in the report. The security report may also include remediation actions that can immediately improve the distributed system. For example, assessment component 116 may indicate the need for a new communication link between two nodes that were not previously connected directly (e.g., computing device 104*b* and computing device 104*d*). In response to receiving an approval of the remediation action, network testing module 108 may perform the action (e.g., establish the communication link).

FIG. 2 illustrates a flow diagram of method 200 for testing distributed systems using injected network partitions. At 202, network testing module 108 monitors communication between a plurality of computing devices (e.g., computing devices 104) in a distributed system (e.g., distributed system 102) using a test operation. In some aspects, the test operation comprises one or more of: reading or writing data from a storage device of the distributed system, producing and processing messages in a message queuing system of the distributed system, and reading or writing to a map in a distributed data structure of the distributed system. In some aspects, the test operation may be job 106.

At 204, network testing module 108 identifies, based on the monitoring, each communication link that exists between two respective computing devices (e.g., computing device 104*a* and computing device 104*b*, computing device 104*b* and computing device 104*c*, etc.) in the distributed system.

At 206, network testing module 108 generates a communications list comprising a plurality of computing device pairs. Each pair of the plurality of computing device pairs includes two of the plurality of computing devices directly connected by a respective communication link.

At 208, network testing module 108 injects a network partition in at least one pair of the plurality of computing device pairs. In some aspects, network testing module 108 injects the network partition by changing iptables configuration of the at least one pair to cut communication between computing devices of the at least one pair. In some aspects, network testing module 108 injects the network partition by utilizing software-defined networking (SDN) rules to cut communication between computing devices of the at least one pair. For example, network testing module 108 may inject a network partition between computing device 104*a* and computing device 104*b*.

In some aspects, network testing module 108 monitors, subsequent to injecting the network partition, for attributes indicative of critical issues. For example, the attributes may include one or more of: a job failure, a device failure, data loss, dropped packets, freezes. For example, after the network partition is injected, network testing module 108 may instruct distributed system 102 to execute job 106, and may subsequently monitor for attributes such as job 106 failing, a computing device experiencing freezes or data loss, and packets normally being exchanged between computing device being dropped.

At 210, network testing module 108 detects whether a performance degradation greater than a threshold performance occurs in response to the network partition. For example, the performance degradation and threshold performance may both be quantitative values (e.g., a percentage) or qualitative values (e.g., critical, high, medium, etc.). For example, the performance degradation may be based on performance value differences (described in FIGS. 3-4). Suppose that the threshold performance is a maximum degradation allowable (e.g., 20%) and the performance degradation is 30%. In response to detecting the performance degradation greater than the threshold performance, method 200 advances to 212, where network testing module

108 generates a security report indicative of the performance degradation and the at least one pair of the plurality of computing device pairs causing the performance degradation. For example, the report may indicate that a network partition between computing device 104*a* and computing device 104*b* will cause a performance degradation of 30%. At 214, network testing module 108 transmits the security report to a device of a user (e.g., an administrator of distributed system 102, a developer of an application executed during job 106) associated with the distributed system. The report may indicate that a patch or network change is necessary to resolve the issues detected in performance.

If at 210, network testing module 108 determines that the performance degradation is not greater than the threshold performance, method 200 advances to 216, where network testing module 108 reinstates (or repairs) a communication link between the at least one pair of the plurality of computing device pairs (e.g., by undoing the changes to the iptables configuration).

At 218, network testing module 108 injects the network partition in at least one different pair of the plurality of computing device pairs. In some aspects, network testing module 108 iterates through all pairs in the communications list by injecting the network partition in each pair and combination of pairs while assessing for performance degradation after each injection.

FIG. 3 illustrates a flow diagram of method 300 for calculating a difference in distributed system performance before and after insertion of a network partition. At 302, network testing module 108 calculates a respective performance value for each computing device of the plurality of computing devices during operation of a job when no network partition is injected.

At 304, network testing module 108 calculates a system-wide performance value of the distributed system using each calculated respective performance value. At 306, network testing module 108 calculates another respective performance value for each computing device of the plurality of computing devices during operation of the job when the network partition is injected.

At 308, network testing module 108 calculates another system-wide performance value of the distributed system using each calculated respective performance value for when the network partition is injected. At 310, network testing module 108 calculates a difference between the system-wide performance value and the another system-wide performance value.

FIG. 4 illustrates a flow diagram of method 400 for calculating a performance value based on one or more logs. In particular, method 400 describes calculating the respective performance value for each computing device described in methods 200 and 300. At 402, network testing module 108 retrieves one or more logs that include information about each computing device during the job, wherein the information comprises hardware performance information, network performance information, and job performance information. At 404, network testing module 108 generates the respective performance value based on the information in the one or more logs.

Figure 5:
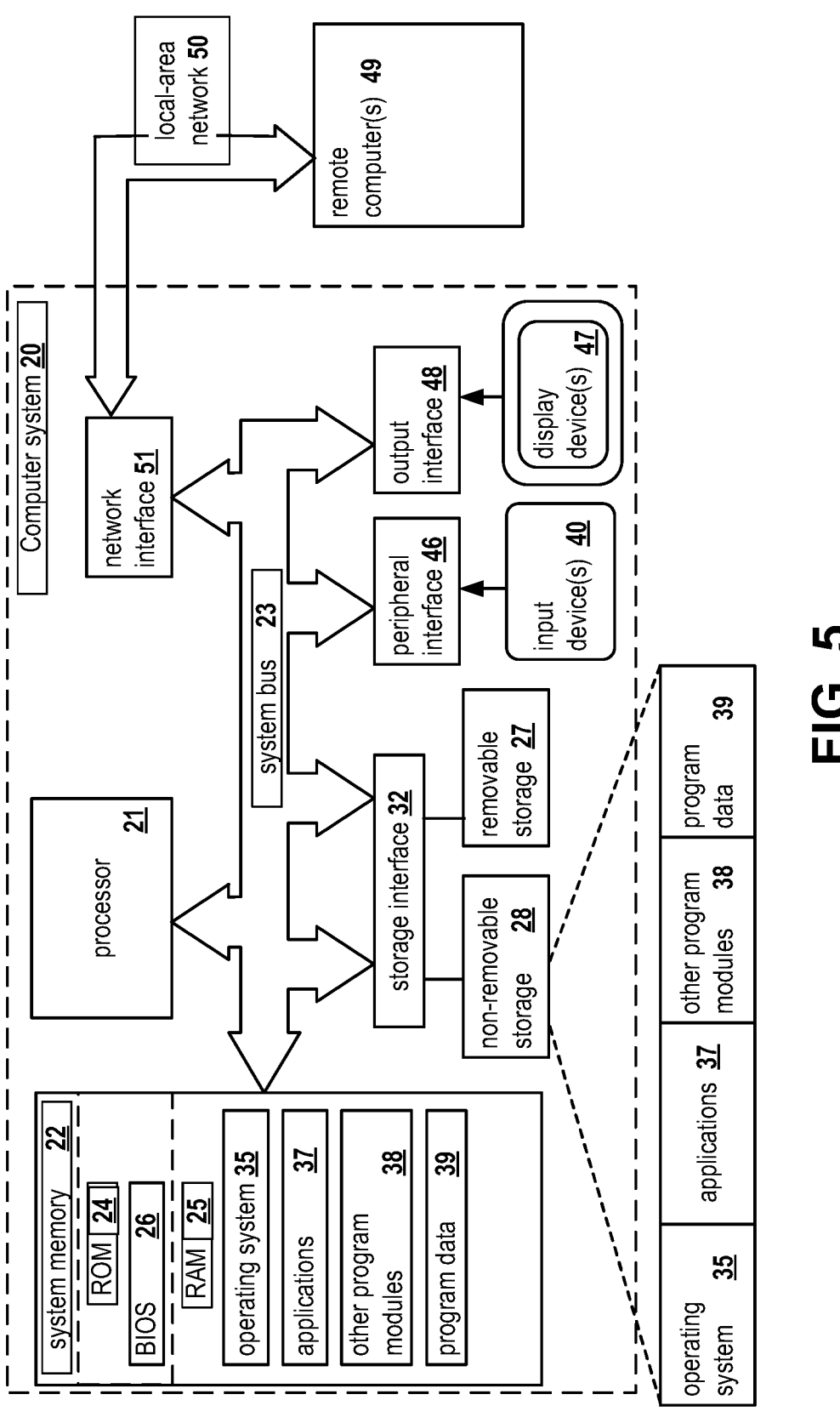
FIG. 5 presents an example of a general-purpose computer system on which aspects of the present disclosure can be implemented.

FIG. 5 is a block diagram illustrating a computer system 20 on which aspects of systems and methods for testing distributed systems using injected network partitions may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, 12C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter.

In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for testing a distributed system, the method comprising:
   monitoring communication between a plurality of computing devices in a distributed system using a test operation;
   identifying, based on the monitoring, each communication link that exists between two respective computing devices in the distributed system;
   generating a communications list comprising a plurality of computing device pairs, wherein each pair comprises two of the plurality of computing devices directly connected by a respective communication link;
   injecting a network partition in at least one pair of the plurality of computing device pairs, wherein injecting the network partition comprises utilizing software-defined networking (SDN) rules to cut communication between computing devices of the at least one pair;
   detecting whether a performance degradation greater than a threshold performance occurs in response to the network partition;
   in response to detecting the performance degradation greater than the threshold performance, generating a security report indicative of the performance degradation and the at least one pair of the plurality of computing device pairs causing the performance degradation; and
   transmitting the security report to a device of a user associated with the distributed system.

2. The method of claim 1, further comprising:
   in response to not detecting the performance degradation greater than the threshold performance, reinstating a communication link between the at least one pair of the plurality of computing device pairs; and
   injecting the network partition in at least one different pair of the plurality of computing device pairs.

3. The method of claim 2, further comprising iterating through all pairs in the communications list by injecting the network partition in each pair and combination of pairs while assessing for performance degradation after each injection.

4. The method of claim 1, wherein the test operation comprises one or more of: reading or writing data from a storage device of the distributed system, producing and processing messages in a message queuing system of the distributed system, and reading or writing to a map in a distributed data structure of the distributed system.

5. The method of claim 1, wherein detecting whether the performance degradation greater than the threshold performance occurs comprises:
   calculating a respective performance value for each computing device of the plurality of computing devices during operation of a job when no network partition is injected;
   calculating a system-wide performance value of the distributed system using each calculated respective performance value;
   calculating another respective performance value for each computing device of the plurality of computing devices during operation of the job when the network partition is injected;
   calculating another system-wide performance value of the distributed system using each calculated respective performance value for when the network partition is injected; and calculating a difference between the system-wide performance value and the another system-wide performance value.

6. The method of claim 5, wherein calculating the respective performance value for each computing device comprises:

retrieving one or more logs that include information about each computing device during the job, wherein the information comprises hardware performance information, network performance information, and job performance information; and generating the respective performance value based on the information in the one or more logs.

7. The method of claim 1, wherein injecting the network partition comprises changing iptables configuration of the at least one pair to cut communication between computing devices of the at least one pair.

8. The method of claim 1, further comprising monitoring, subsequent to injecting the network partition, for attributes indicative of critical issues, wherein the attributes comprises one or more of: a job failure, a device failure, data loss, dropped packets, freezes.

9. A system for testing a distributed system, comprising:

at least one memory; and at least one hardware processor coupled with the at least one memory and configured, individually or in combination, to:

monitor communication between a plurality of computing devices in a distributed system using a test operation;

identify, based on the monitoring, each communication link that exists between two respective computing devices in the distributed system;

generate a communications list comprising a plurality of computing device pairs, wherein each pair comprises two of the plurality of computing devices directly connected by a respective communication link;

inject a network partition in at least one pair of the plurality of computing device pairs, wherein injecting the network partition comprises utilizing software-defined networking (SDN) rules to cut communication between computing devices of the at least one pair;

detect whether a performance degradation greater than a threshold performance occurs in response to the network partition;

in response to detecting the performance degradation greater than the threshold performance, generate a security report indicative of the performance degradation and the at least one pair of the plurality of computing device pairs causing the performance degradation; and transmit the security report to a device of a user associated with the distributed system.

10. The system of claim 9, wherein the at least one hardware processor is configured to:

in response to not detecting the performance degradation greater than the threshold performance, reinstate a communication link between the at least one pair of the plurality of computing device pairs; and inject the network partition in at least one different pair of the plurality of computing device pairs.

11. The system of claim 10, wherein the at least one hardware processor is configured to iterate through all pairs in the communications list by injecting the network partition in each pair and combination of pairs while assessing for performance degradation after each injection.

12. The system of claim 9, wherein the test operation comprises one or more of: reading or writing data from a storage device of the distributed system, producing and processing messages in a message queuing system of the distributed system, and reading or writing to a map in a distributed data structure of the distributed system.

13. The system of claim 9, wherein the at least one hardware processor is configured to detect whether the performance degradation greater than the threshold performance by:

calculating a respective performance value for each computing device of the plurality of computing devices during operation of a job when no network partition is injected;

calculating a system-wide performance value of the distributed system using each calculated respective performance value;

calculating another respective performance value for each computing device of the plurality of computing devices during operation of the job when the network partition is injected;

calculating another system-wide performance value of the distributed system using each calculated respective performance value for when the network partition is injected; and calculating a difference between the system-wide performance value and the another system-wide performance value.

14. The system of claim 13, wherein the at least one hardware processor is configured to calculating the respective performance value for each computing device by:

retrieving one or more logs that include information about each computing device during the job, wherein the information comprises hardware performance information, network performance information, and job performance information; and generating the respective performance value based on the information in the one or more logs.

15. The system of claim 9, wherein the at least one hardware processor is configured to inject the network partition by changing iptables configuration of the at least one pair to cut communication between computing devices of the at least one pair.

16. The system of claim 9, wherein the at least one hardware processor is configured to monitor, subsequent to injecting the network partition, for attributes indicative of critical issues, wherein the attributes comprises one or more of: a job failure, a device failure, data loss, dropped packets, freezes.

17. A non-transitory computer readable medium storing thereon computer executable instructions for testing a distributed system, including instructions for:

monitoring communication between a plurality of computing devices in a distributed system using a test operation;

identifying, based on the monitoring, each communication link that exists between two respective computing devices in the distributed system;

generating a communications list comprising a plurality of computing device pairs, wherein each pair comprises two of the plurality of computing devices directly connected by a respective communication link;

injecting a network partition in at least one pair of the plurality of computing device pairs, wherein injecting the network partition comprises utilizing software-defined networking (SDN) rules to cut communication between computing devices of the at least one pair;

detecting whether a performance degradation greater than a threshold performance occurs in response to the network partition;

in response to detecting the performance degradation greater than the threshold performance, generating a security report indicative of the performance degradation and the at least one pair of the plurality of computing device pairs causing the performance degradation; and transmitting the security report to a device of a user associated with the distributed system.

\* \* \* \* \*